United States Patent
Yuzurihara et al.

[11] Patent Number: 6,096,398
[45] Date of Patent: Aug. 1, 2000

[54] PHASE-CHANGE OPTICAL RECORDING MEDIUM

[75] Inventors: Hajime Yuzurihara; Hiroshi Deguchi; Michiaki Shinotsuka; Takashi Shibaguchi; Makoto Harigaya; Mikio Kinoshita; Yoshiyuki Kageyama; Michiharu Abe, all of Kanagawa, Japan

[73] Assignee: Ricoh Company, Ltd., Tokyo, Japan

[21] Appl. No.: 09/199,917

[22] Filed: Nov. 25, 1998

[30] Foreign Application Priority Data

Nov. 28, 1997 [JP] Japan ..................................... 9-344459

[51] Int. Cl.$^7$ ........................................................ B32B 3/00
[52] U.S. Cl. ........................ 428/64.1; 428/64.4; 428/64.5; 428/64.6; 428/913; 430/270.13; 430/495.1; 430/945; 369/283; 369/288
[58] Field of Search ................................... 428/64.1, 64.2, 428/64.4, 64.5, 64.6, 913; 430/270.13, 495.1, 945; 369/283, 288

[56] References Cited

U.S. PATENT DOCUMENTS

| | | |
|---|---|---|
| 4,600,625 | 7/1986 | Abe et al. . |
| 4,656,121 | 4/1987 | Sato et al. . |
| 4,714,667 | 12/1987 | Sato et al. . |
| 4,758,499 | 7/1988 | Abe et al. . |
| 4,767,693 | 8/1988 | Oba et al. . |
| 4,891,305 | 1/1990 | Oba et al. . |
| 5,011,723 | 4/1991 | Harigaya et al. . |
| 5,024,927 | 6/1991 | Yamada et al. . |
| 5,080,947 | 1/1992 | Yamada et al. . |
| 5,100,700 | 3/1992 | Ide et al. . |
| 5,156,693 | 10/1992 | Ide et al. . |
| 5,196,250 | 3/1993 | Abe et al. . |
| 5,298,305 | 3/1994 | Shinozuka . |
| 5,637,372 | 6/1997 | Tominaga . |
| 5,703,867 | 12/1997 | Miyauchi ............................. 369/275.3 |
| 5,736,657 | 4/1998 | Ide et al. ................................... 75/230 |
| 5,948,496 | 9/1999 | Kinoshita et al. ..................... 428/64.1 |

FOREIGN PATENT DOCUMENTS 0735158  10/1996  European Pat. Off. .

OTHER PUBLICATIONS

Database WPI Sec Ch Week 9117 Derwent Class A89, AN91–122554 XP 002095887 Abstract of JP 03063178A (Mar. 1991).

*Primary Examiner*—Elizabeth Evans
*Attorney, Agent, or Firm*—Cooper & Dunham LLP

[57] ABSTRACT

A phase-change optical recording medium has a substrate, and a lower heat-resistant protective layer, a recording layer capable of recording and erasing information by utilizing changes in the phase of a phase-change recording material in the recording layer, an upper heat-resistant protective layer and a light reflecting and heat dissipating layer, which are successively overlaid on the substrate in this order, the recording material including Ag, In, Sb and Te as the main elements, at least one additional element selected from the group (1) consisting of B, C, N, Al, Si and P, and at least one additional element selected from the group (2) consisting of halogen atoms and alkali metal elements.

8 Claims, 1 Drawing Sheet

FIGURE
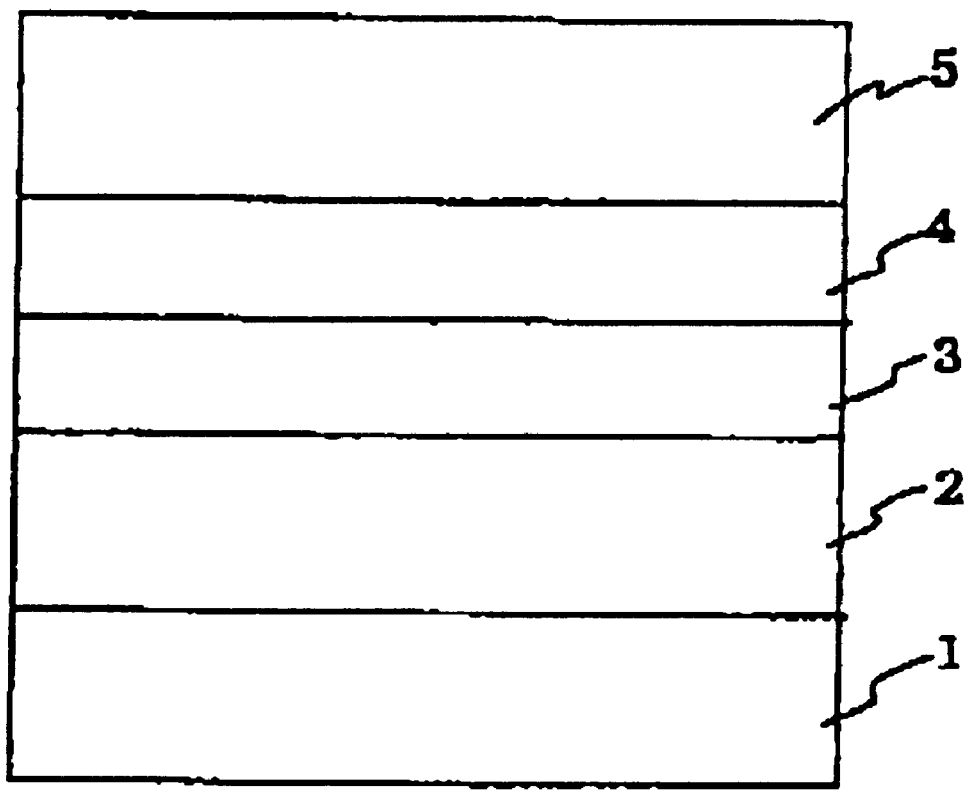

PHASE-CHANGE OPTICAL RECORDING MEDIUM

BACKGROUND OF THE INVENTION

1. Field of the Invention

The present invention relates to a phase-change optical recording medium comprising a phase-change recording material of which optical constant is changeable by the application thereto of electromagnetic wave, in particular, a semiconductor laser beam, so as to carry out the recording and reproducing of information.

2. Discussion of Background

The phase-change optical recording medium is one of the optical recording media that can recording, reproducing and erasing information by the application of a laser beam thereto.

In terms of the structure of layers, a representative example of the phase-change optical recording medium is shown in a single figure. As shown in the figure, a lower heat-resistant protective layer 2 a recording layer 3, an upper heat-resistant protective layer 4 and a light reflecting and heat dissipating layer 5 are successively overlaid in a substrate 1 in this order in the phase-change optical recording medium.

A variety of materials, for example, GeTe, GeTeSe, GeSbTe and GeSbTeSe are conventionally known as the phase-change recording materials for use in the recording layer 3. Furthermore, a phase-change recording material comprising AgInSbTe which exhibits high sensitivity and excellent erasing properties is disclosed in Japanese Laid-Open Patent Applications 2-37466, 2-171325, 2-415581 and 4-141485.

The aforementioned conventional phase-change optical recording media are subjected to recording operation in a heat mode, so that there is observed a deteriorating tendency in the repetition of recording and erasing operations. The improvement of such repetition properties is therefore one of the most important research topics.

To improve the repetition properties, it is proposed to add a nitrogen atom to the recording layer as disclosed in Japanese Laid-Open Patent Applications 4-16383 and 8-287515. Further, as in Japanese Laid-Open Patent Application 8-287515, to improve the repetition properties, a recording layer is located so as to be interposed between a lower heat-resistant protective layer and an upper heat-resistant protective layer, and in addition, another heat-resistant protective layer is overlaid as the third heat-resistant protective layer on the upper heat-resistant protective layer. In this case, the coefficient of thermal expansion of the third heat-resistant protective layer is controlled to be smaller than those of the lower and upper heat-resistant protective layers. As a result, deformation of the recording layer, which is easily caused by the movement of elements constituting the recording layer when heat is applied to the recording medium, can be prevented.

However, the addition of a nitrogen atom to the recording material increases the crystallization temperature of the recording material. As a result, initial crystallization of the phase-change optical recording medium cannot be readily carried out, and the time required to terminate the initial crystallization is increased. Further, the provision of the third heat-resistant protective layer is disadvantageous from the manufacturing cost.

SUMMARY OF THE INVENTION

Accordingly, it is a first object of the present invention to provide a phase-change optical recording medium which does not deteriorate in the repetition of the recording, erasing and reproducing operations.

A second object of the present invention is to provide a phase-change optical recording medium of which initial crystallization can be carried out very easily.

The above-mentioned objects of the present invention can be achieved by a phase-change optical recording medium comprising a substrate, and a lower heat-resistant protective layer, a recording layer capable of recording and erasing information by utilizing changes in the phase of a phase-change recording material in the recording layer, an upper heat-resistant protective layer and a light reflecting and heat dissipating layer, which are successively overlaid on the substrate in this order, the recording material comprising Ag, In, Sb and Te as the main elements, at least one additional element selected from the group (1) consisting of B, C, N, Al, Si and P, and at least one additional element selected from the group (2) consisting of halogen atoms and alkali metal elements.

As the alkali metal elements, Na and K are preferable.

To be more specific, it is preferable that the recording material comprise Ag, In, Sb and Te as the main elements, at least one additional element selected from the group (1) consisting of B, C, N, Al, Si and P, and at least one additional element selected from the group (2') consisting of Cl, Br, I, Na and K.

In this case, it is desirable that the composition of the phase-change recording material in terms of atomic percentage (atm. %) be represented by the following formula (I):

wherein X is at least one element selected from the group consisting of B, C, N, Al, Si and P; Y is at least one element selected from the group consisting of Cl, Br, I, Na and K; $\alpha+\beta+\gamma+\delta+\epsilon+\kappa=100$; $0.5 \leq \epsilon \leq 5$; and $0.5 \leq \kappa \leq 3$.

Alternatively, it is preferable that the recording material comprise Ag, In, Sb and Te as the main elements, at least one additional element selected from the group (1') consisting of B, C, Al, Si and P, and a fluorine (F) atom.

In this case, it is desirable that the composition of the phase-change recording material in terms of atomic percentage (atm. %) be represented by the following formula (II):

wherein X' is at least one element selected from the group consisting of B, C, Al, Si and P; Y' is F; $\alpha+\beta+\gamma+\delta+\rho+\phi=100$; $0.5 \leq \rho \leq 5$; and $0.5 \leq \phi \leq 3$.

Furthermore, it is preferable that each of the lower heat-resistant protective layer or the upper heat-resistant protective layer exhibit a coefficient of thermal expansion in the range of $10 \times 10^{-6}/°C.$ to $25 \times 10^{-6}/°C.$ In such a case, it is preferable that each of the lower or upper heat-resistant protective layer comprise at least one compound selected from the group consisting of $NaF$, $BaF_2$, $CoF_2$, $RbF_2$, $SrF_2$, $MgF_2$, $PbF_2$, $KF$, $CeF_3$, $NdF_3$, $ZnS$ and $ZnO$.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

a single figure is a cross-sectional view of an example of a phase-change optical recording medium according to the present invention.

DESCRIPTION OF THE PREFERRED EMBODIMENTS

According to the present invention, the recording layer of the phase-change optical recording medium comprises a phase-change optical recording material comprising Ag, In, Sb and Te as the main elements. Au can be used in place of Ag. Further, the recording material further comprises at least one additional element with a large coordination number, belonging to the second and third series in the periodic table, that can be selected from the group (1) consisting of B, C, N, Al, Si and P, and at least one additional element selected from the group (2) consisting of halogen atoms and alkali metal elements.

The average coordination number among the elements constituting the recording material may be adjusted to approach 2.35 by the addition of the above-mentioned element with a large coordination number to the recording material. In the case where the average coordination number is close to 2.35, the recording material in a crystalline state can easily become glassy when the recording material is fused, followed by rapid cooling. This means the improvement of recording characteristics At the same time, the viscosity of the fused recording material can be increased. Therefore, the elements constituting the recording layer can be inhibited from flowing and moving therein when the recording layer is fused by the application of a laser beam thereto. As a result, the repetition properties of the obtained recording medium can be improved.

However, the addition of the above-mentioned element with a large coordination number to the recording material produces an unfavorable side effect. Namely, initial crystallization of the recording layer cannot be readily carried out. Therefore, according to the present invention, the recording material further comprises at least one additional element selected from the group consisting of the above-mentioned halogen atoms and alkali metal elements.

In particular, it is preferable that the recording material comprise Ag, In, Sb and Te as the main elements, at least one additional element selected from the group (1) consisting of B, C, N, Al, Si and P, and at least one additional element selected from the group (2') consisting of Cl, Br, I and alkali metal elements, Alternatively, it is also preferable that the recording material comprise Ag, In, Sb and Te as the main elements, at least one additional element selected from the group (1') consisting of B, C, Al, Si and P, and a fluorine (F) atom.

As the alkali metal elements, Na and K are preferably employed in the present invention.

It is preferable that the amount of the additional element with a large coordination number be in the range of 0.5 to 5 atom %, more preferably in the range of 2 to 5 atom % with respect to the composition of the recording material.

It is preferable that the amount of another additional element selected from the group consisting of halogen atoms such as Cl, Br, I and F and alkali metals such as Na and K be in the range of 0.5 to 3 atom %, more preferably in the range of 1 to 3 atom % with respect to the composition of the recording material.

In the present invention, it is desirable that each of the lower heat-resistant protective layer or the upper heat-resistant protective layer exhibit a coefficient of thermal expansion in a range of $10 \times 10^{-6}/° C.$ to $25 \times 10^{-6}/° C.$ The coefficient of thermal expansion of the recording layer for use in the present invention is $23 \times 10^{-6}/° C.$ When the coefficients of thermal expansion of the lower and upper heat-resistant protective layers are close to that of the recording layer which is interposed between those protective layers, thermal expansion of those three layers are almost the same even though a laser beam is applied to the recording medium for the recording and erasing operation. As a result, the stress caused by the difference in thermal expansion can be minimized, and therefore, the repetition properties of the recording medium can be improved.

To obtain such lower and upper heat-resistant protective layers, it is recommendable that each of the lower or upper heat-resistant protective layer comprise at least one compound selected from the group consisting of NaF, $BaF_2$, $CoF_2$, $RbF_2$, $SrF_2$, $MgF_2$, $PbF_2$, KF, $CeF_3$, $NdF_3$, ZnS and ZnO.

The coefficients of thermal expansion of the abovementioned compounds are as follows:

NaF: $32 \times 10^{-6}/° C.$
$BaF_2$: $18 \times 10^{-6}/° C.$
$CoF_2$: $18 \times 10^{-6}/° C.$
$RbF_2$: $34 \times 10^{-6}/° C.$
$SrF_2$; $17 \times 10^{-6}/° C.$
$MgF_2$: $20 \times 10^{-6}/° C.$
$PbF_2$: $32 \times 10^{-6}/° C.$
KF: $25 \times 10^{-6}/° C.$
$CeF_3$: $15 \times 10^{-6}/° C.$
$NbF_3$: $15 \times 10^{-6}/° C.$
ZnS: $8.0 \times 10^{-6}/° C.$
ZnO: $8.5 \times 10^{-6}/° C.$ The coefficient of thermal expansion of the lower heat-resistant protective layer and that of the upper heat-resistant protective layer may be adjusted by adding at least one of the above-listed compounds to the composition of each heat-resistant protective layer.

The structure of the phase-change optical recording medium according to the present invention is similar to that as illustrated in the single figure.

Namely, a lower heat-resistant protective layer 2, a recording layer 3, an upper heat-resistant protective layer 4, and a light reflecting and heat dissipating layer 5 are successively overlaid on a substrate 1 which bears guide grooves thereon.

Examples of the materials for the substrate 1 are glass, ceramics and resins. In view of moldability, a substrate made of a resin is preferable in the present invention.

Representative examples of the resin for the preparation of the substrate 1 include polycarbonate resin, acrylic resin, epoxy resin, polystyrene resin, polyethylene resin, polypropylene resin, silicone resin, fluorine-containing resin, ABS resin and urethane resin. Of these resins, polycarbonate resin is most preferable as the material for the substrate 1 in terms of the workability and the optical characteristics thereof.

The substrate 1 may be in the shape of a disk, a card or a sheet.

The lower and upper heat-resistant protective layers 2 and 4 can be provided by, for example, vacuum deposition, sputtering or electron beam deposition.

The thickness of each heat-resistant protective layer 2 or 4 varies depending upon the functions as the heat-resistant layer and the optical interference layer. In the present invention, it is preferable that the thickness of the lower heat-resistant protective layer 2 be in the range of 500 to 3,000 Å, more preferably in the range of 800 to 2,000 Å. It is preferable that the thickness of the upper heat-resistant protective layer 4 be in the range of 100 to 1,000 Å, more preferably in the range of 150 to 350 Å.

The recording layer 3 can also be provided on the lower heat-resistant protective layer 2 by the same method as mentioned above. The thickness of the recording layer 3 varies depending upon the band gap of a recording material to be employed for the recording layer 3. When the recording material with a band gap of 1.0 eV or more is employed, it is preferable that the thickness of the recording layer 3 be in the range of 50 to 500 Å, more preferably in the range of 100 to 250 Å. In contrast to this, when the recording material has a band gap of less than 1.0 eV, the thickness of the recording layer 3 may be decreased so as to increase the transmitted light.

The light reflecting and heat dissipating layer 5 can be made of various kinds of metals and alloys thereof. In particular, Al alloys such as Al-Ti, Al-Ni, Al-Mn, Al-Cr, Al-Zr and Al-Si, and Ag alloys such as Ag-Pd are preferably employed for the preparation of the light reflecting and heat dissipating layer 5. The light reflecting and heat dissipating layer can be formed by vacuum deposition, sputtering or electron beam deposition method. It is preferable that the light reflecting and heat dissipating layer have a thickness in the range of 200 to 3000 Å, more preferably in the range of 500 to 2000 Å.

Other features of this invention will become apparent in the course of the following description of exemplary embodiments, which are given for illustration of the invention and are not intended to be limiting thereof.

EXAMPLE 1

On a polycarbonate substrate with a thickness of 1.2 mm and a diameter of 120 mm bearing thereon guide grooves with a pitch of 1.6 μm and a depth of 600 Å, a lower heat-resistant protective layer, a recording layer, an upper heat-resistant protective layer, and a light reflecting and heat dissipating layer were successively overlaid by the sputtering method. The material and the thickness of each layer are shown in Table 1.

Thus, a phase-change optical recording medium No. 1 according to the present invention was fabricated.

TABLE 1

| Structure of Layers | Film-forming Conditions | | |
|---|---|---|---|
| | Material | Thickness (Å) | Film-forming method |
| Lower heat-resistant protective layer | $(ZnS)_{80}(SiO_2)_{20}$ (mol %) | 1700 | RF Sputtering |
| Recording layer | $Ag_3In_5Sb_{59}Te_{26}N_5Cl_3$ (atom %) | 230 | RF Sputtering |
| Upper heat-resistant protective layer | $(ZnS)_{80}(SiO_2)_{20}$ (mol %) | 350 | RF Sputtering |
| Light reflecting and heat dissipating layer | Al alloy | 900 | DC Sputtering |

The thus fabricated recording medium No. 1 was initialized using a semiconductor laser beam with high power output. The optimal initializing conditions are shown in Table 2.

The distribution of reflectance was obtained by measuring the reflectance around one arbitrary track of the recording medium immediately after the recording medium was initialized The result is also shown in Table 2.

Thereafter, a recording mark was written into the recording medium No. 1 in such a manner that the recording signal of an Eight to Fourteen Modulation (EFM) random pattern (8.64 MHz) was applied to the recording medium at a linear speed of the recording medium being set to 2.8 m/s.

The overwriting repetition properties of the optical recording medium No. 1 were evaluated in terms of the jitter value with respect to 3T signals by reproducing the overwritten EFM random pattern. The linear speed of the recording medium was 2.8 m/s at the reproduction operation.

The results are shown Table 2.

TABLE 2

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 750 | 8 | 8 | 10 | 8 | 11 | 13 |
| Linear speed of recording medium (m/s) | 4.0 | 9 | 8 | 10 | 7 | 11 | 13 |
| Laser spot feed speed (μm/r) | 36 | 10 | 7 | 9 | 7 | 10 | 14 |
| | | 11 | 7 | 8 | 8 | 10 | 15 |
| Distribution of reflectance after initialization (±%) | 4.7 | 12 | 8 | 9 | 9 | 11 | 16 |
| | | 13 | 8 | 9 | 9 | 11 | 17 |

(*)The number of repeated overwriting times.

When the atomic percentage of Cl was 3 atom % or less in the composition of the recording layer for use in the optical recording medium No. 1 in Example 1, crystallization was prevented during the storage of the recording medium. In other words, the preservation stability of the recording medium was excellent. Further, other halogen atoms than Cl produced the same effects as in Example 1.

COMPARATIVE EXAMPLE 1

The procedure for fabrication of the phase-change optical recording medium No. 1 in Example 1 was repeated except that the composition of the recording layer was changed as shown in Table 3.

TABLE 3

| Structure of Layers | Film-forming Conditions | | |
|---|---|---|---|
| | Material | Thickness (Å) | Film-forming method |
| Lower heat-resistant protective layer | $(ZnS)_{80}(SiO_2)_{20}$ (mol %) | 1700 | RF Sputtering |
| Recording layer | $Ag_3In_5Sb_{50}Te_{30}N_2$ (atom %) | 230 | RF Sputtering |
| Upper heat-resistant protective layer | $(ZnS)_{80}(SiO_2)_{20}$ (mol %) | 350 | RF Sputtering |
| Light reflecting and heat | Al alloy | 900 | DC Sputtering |

TABLE 3-continued

| Structure of Layers | Material | Film-forming Conditions Thickness (Å) | Film-forming method |
|---|---|---|---|
| dissipating layer | | | |

Thus, a comparative phase-change optical recording medium No. 1 was fabricated.

The optimal initializing conditions and the distribution of reflectance after initialization are shown in Table 4.

In addition, the overwriting repetition properties of the comparative optical recording medium No. 1 were evaluated in the same as in Example 1.

The results are shown in Table 4.

TABLE 4

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 850 | 8 | 12 | 14 | 11 | 14 | 25 |
| Linear speed of recording medium (m/s) | 3.5 | 9 | 11 | 12 | 10 | 12 | 30 |
| Laser spot feed speed (µm/r) | 20 | 10 11 | 11 9 | 12 10 | 9 8 | 11 11 | 33 35 |
| Distribution of reflectance after initialization (±%) | 5.8 | 12 13 | 8 8 | 9 8 | 10 12 | 12 13 | 37 44 |

(*)The number of repeated overwriting times.

When the evaluation results shown in Table 2 are compared with those in Table 4, the jitter value with respect to the 3T signal obtained from the recording medium of Example 1 is similar to that obtained from the comparative recording medium of Comparative Example 1 until the number of repeated overwriting times reaches 1000 times. When the overwriting operation is repeated 5000 times, the jitter value sharply increases in Comparative Example 1. In contrast to this, the jitter value is not so much changed in Example 1 even after the overwriting operation is repeated 5000 times.

In addition, as can be seen from the results in Tables 2 and 4, the jitter value obtained from the recording medium of Example 1 is smaller than that obtained from the comparative recording medium of Comparative Example 1 when the power for recording is low. This means that the recording medium fabricated in Example 1 is improved in terms of the sensitivity.

With respect to the initializing conditions, the power for initializing the recording medium of Example 1 can be made lower and the linear speed of the recording medium of Example 1 can be made higher than those for the comparative recording medium of Comparative Example 1. Namely, thermal damage applied to the recording medium at the initialization can be reduced in Example 1. It is considered that such reduction of thermal damage at the initialization contribute to the improvement of overwriting repetition properties.

EXAMPLE 2

The procedure for fabrication of the phase-change optical recording medium No. 1 in Example 1 was repeated except that the composition of the recording layer was changed as shown in Table 5.

TABLE 5

| Structure of Layers | Material | Film-forming Conditions Thickness (Å) | Film-forming method |
|---|---|---|---|
| Lower heat-resistant protective layer | $(ZnS)_{80}(SiO_2)_{20}$ (mol %) | 1700 | RF Sputtering |
| Recording layer | $Ag_3In_5Sb_{59}Te_{30}N_2Cl_1$ (atom %) | 230 | RF Sputtering |
| Upper heat-resistant protective layer | $(ZnS)_{80}(SiO_2)_{20}$ (mol %) | 350 | RF Sputtering |
| Light reflecting and heat dissipating layer | Al alloy | 900 | DC Sputtering |

Thus, a phase-change optical recording medium No. 2 according to the present invention was fabricated.

The optimal initializing conditions and the distribution of reflectance after initialization are shown in Table 6.

In addition, the overwriting repetition properties of the optical recording medium No. 2 were evaluated in the same as in Example 1.

The results are shown in Table 6.

TABLE 6

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 730 | 8 | 10 | 12 | 9 | 11 | 14 |
| Linear speed of recording medium (m/s) | 4.0 | 9 | 10 | 11 | 8 | 12 | 15 |
| Laser spot feed speed (µm/r) | 36 | 10 11 | 8 8 | 11 10 | 9 9 | 10 10 | 16 16 |
| Distribution of reflectance after initialization (±%) | 4.5 | 12 13 | 9 9 | 11 8 | 10 10 | 11 12 | 18 19 |

(*)The number of repeated overwriting times.

When the evaluation results shown in Table 2 are compared with those in Table 6, the overwriting repetition properties of the recording medium No. 1 are slightly better than those of the recording medium No. 2 after overwriting operation is repeated 5000 times. The reason for this is that the content of N in the composition of the recording layer for use in Example 1 is more suitable.

As can be seen from the results of the distribution of reflectance after initialization, the initialization of both the recording medium No. 1 and the recording medium No. 2 can be carried out easily. However, the recording sensitivity of the recording medium No. 1 is slightly better than that of the recording medium No. 2 when the recording power is low. Such advantages of the recording medium No. 1 results from the proper content of Cl in the composition of the recording layer. It is therefore considered that Cl serves as a donor in the recording layer.

EXAMPLE 3

The procedure for fabrication of the phase-change optical recording medium No. 1 in Example 1 was repeated except that the composition of the recording layer was changed as shown in Table 7.

TABLE 7

| Structure of Layers | Material | Film-forming Conditions | | |
|---|---|---|---|---|
| | | Thickness (Å) | Film-forming method | |
| Lower heat-resistant protective layer | $(ZnS)_{80}(SiO_2)_{20}$ (mol %) | 1700 | RF Sputtering |
| Recording layer | $Ag_3In_5Sb_{58}Te_{26}Si_5Na_3$ (atom %) | 230 | RF Sputtering |
| Upper heat-resistant protective layer | $(ZnS)_{80}(SiO_2)_{20}$ (mol %) | 350 | RF Sputtering |
| Light reflecting and heat dissipating layer | Al alloy | 900 | DC Sputtering |

Thus, a phase-change optical recording medium No. 3 according to the present invention was fabricated.

The optimal initializing conditions and the distribution of reflectance after initialization are shown in Table 8.

In addition, the overwriting repetition properties of the optical recording medium No. 3 were evaluated in the same as in Example 1.

The results are shown in Table 8.

TABLE 8

| Optimal Initializing Conditions and Distribution of Reflectance after Initialization | | Overwriting Repetition Properties [Jitter value (ns) with respect to 3T signal] | | | | |
|---|---|---|---|---|---|---|
| | | Recording power (mW) | No.(*) | | | |
| | | | 1 | 2 | 100 | 1000 | 5000 |
| Laser power (mW) | 760 | 8 | 10 | 12 | 9 | 13 | 14 |
| Linear speed of recording medium (m/s) | 4.0 | 9 | 10 | 11 | 10 | 12 | 15 |
| Laser spot feed speed (μm/r) | 30 | 10 11 | 9 9 | 11 10 | 9 11 | 11 10 | 16 17 |
| Distribution of reflectance after initialization (±%) | 4.7 | 12 13 | 8 8 | 10 9 | 10 10 | 10 13 | 17 19 |

(*)The number of repeated overwriting times.

When the evaluation results shown in Table 8 are compared with those in Table 4, the overwriting repetition properties of the recording medium No. 3 are improved. However, when the results in Table 8 are compared with those in Table 2, the recording medium No. 3 shows the tendency that the recording sensitivity deteriorates when the laser power for recording is relatively low. The reason for this is that Na does not function as a donor in the recording layer unlike Cl.

When the content of Si in the composition of the recording layer is 5 atom % or less (not shown in Table 8), the initial crystallization can be easily carried out; and when the content of Na in the composition of the recording layer is 3 atom % or less, the preservation stability of the recording medium is improved. Further, when the content of Si in the composition of the recording layer is 2 atom % or more, the overwriting repetition properties of the recording medium are remarkably improved; and when the content of Na in the composition of the recording layer is 1 atom % or more, initialization of the recording medium can be achieved very easily.

EXAMPLE 4

The procedure for fabrication of the phase-change optical recording medium No. 1 in Example 1 was repeated except that the composition of the recording layer was changed as shown in Table 9.

TABLE 9

| Structure of Layers | Material | Film-forming Conditions | |
|---|---|---|---|
| | | Thickness (Å) | Film-forming method |
| Lower heat-resistant protective layer | $(ZnS)_{80}(SiO_2)_{20}$ (mol %) | 1700 | RF Sputtering |
| Recording layer | $Ag_3In_5Sb_{58}Te_{26}B_5K_3$ (atom %) | 230 | RF Sputtering |
| Upper heat-resistant protective layer | $(ZnS)_{80}(SiO_2)_{20}$ (mol %) | 350 | RF Sputtering |
| Light reflecting and heat dissipating layer | Al alloy | 900 | DC Sputtering |

Thus, a phase-change optical recording medium No. 4 according to the present invention was fabricated.

The optimal initializing conditions and the distribution of reflectance after initialization are shown in Table 10.

In addition, the overwriting repetition properties of the optical recording medium No. 4 were evaluated in the same as in Example 1.

The results are shown in Table 10.

TABLE 10

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 770 | 8 | 11 | 13 | 10 | 12 | 15 |
| Linear speed of recording medium (m/s) | 4.0 | 9 | 10 | 12 | 10 | 12 | 15 |
| Laser spot feed speed (μm/r) | 30 | 10 | 9 | 11 | 9 | 11 | 15 |
| | | 11 | 9 | 10 | 9 | 12 | 17 |
| Distribution of reflectance after initialization (±%) | 4.7 | 12 | 9 | 10 | 9 | 12 | 18 |
| | | 13 | 8 | 10 | 10 | 12 | 19 |

(*)The number of repeated overwriting times.

As can be seen from the results shown in Table 10, the overwriting repetition properties of the recording medium No. 4 are improved.

When the content of B in the composition of the recording layer is 5 atom % or less (not shown in Table 10), the initial crystallization can be easily carried out; and when the content of B is 2 atom % or more, the overwriting repetition properties of the recording medium are remarkably improved. On the other hand, when the content of K in the composition of the recording layer is 3 atom % or less, the preservation stability of the recording medium is improved; and when the content of K is 1 atom % or more, initialization of the recording medium can be achieved very easily.

EXAMPLE 5

The procedure for fabrication of the phase-change optical recording medium No. 1 in Example 1 was repeated except that the compositions of the lower and upper heat-resistant protective layers were changed as shown in Table 11.

TABLE 11

| Structure of Layers | Film-forming Conditions | | |
|---|---|---|---|
| | Material | Thickness (Å) | Film-forming method |
| Lower heat-resistant protective layer | $(MgF_2)_{55}(ZnS)_{45}$ (mol %) | 1700 | RF Sputtering |
| Recording layer | $Ag_3In_5Sb_{58}Te_{26}N_5Cl_3$ (atom %) | 230 | RF Sputtering |
| Upper heat-resistant protective layer | $(MgF_2)_{55}(ZnS)_{45}$ (mol %) | 350 | RF Sputtering |
| Light reflecting and heat dissipating layer | Al alloy | 900 | DC Sputtering |

TABLE 11-continued

| Structure of Layers | Film-forming Conditions | | |
|---|---|---|---|
| | Material | Thickness (Å) | Film-forming method |

Thus, a phase-change optical recording medium No. 5 according to the present invention was fabricated.

The optimal initializing conditions and the distribution of reflectance after initialization are shown in Table 12.

In addition, the overwriting repetition properties of the optical recording medium No. 5 were evaluated in the same as in Example 1.

The results are shown in Table 12.

TABLE 12

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 750 | 8 | 8 | 10 | 8 | 9 | 10 |
| Linear speed of recording medium (m/s) | 4.0 | 9 | 8 | 9 | 7 | 9 | 10 |
| Laser spot feed speed (μm/r) | 36 | 10 | 7 | 9 | 7 | 9 | 11 |
| | | 11 | 7 | 8 | 7 | 9 | 11 |
| Distribution of reflectance after initialization (±%) | 4.7 | 12 | 7 | 8 | 8 | 10 | 12 |
| | | 13 | 7 | 9 | 9 | 11 | 13 |

(*)The number of repeated overwriting times.

It is confirmed that the overwriting repetition properties of the recording medium No. 5 are improved by employing the lower and upper heat-resistant protective layers with such compositions as shown in Table 11. The reason for such improvement of the overwriting repetition properties is that the coefficients of thermal expansion of the lower and upper heat-resistant protective layers are close to those of the recording layer and the light reflecting and heat dissipating layer, and therefore the stress to be generated between the layers can be reduced.

EXAMPLE 6

The procedure for fabrication of the phase-change optical recording medium No. 1 in Example 1 was repeated except that the compositions of the lower and upper heat-resistant protective layers were changed as shown in Table 13.

TABLE 13

| Structure of Layers | Film-forming Conditions | | |
|---|---|---|---|
| | Material | Thickness (Å) | Film-forming method |
| Lower heat-resistant protective layer | $(PbF_2)_{40}(ZnS)_{60}$ (mol %) | 1700 | RF Sputtering |
| Recording layer | $Ag_3In_5Sb_{58}Te_{26}N_5Cl_3$ (atom %) | 230 | RF Sputtering |
| Upper heat-resistant protective layer | $(PbF_2)_{40}(ZnS)_{60}$ (mol %) | 350 | RF Sputtering |
| Light reflecting and heat dissipating layer | Al alloy | 900 | DC Sputtering |

Thus, a phase-change optical recording medium No. 6 according to the present invention was fabricated.

The optimal initializing conditions and the distribution of reflectance after initialization are shown in Table 14.

In addition, the overwriting repetition properties of the optical recording medium No. 6 were evaluated in the same as in Example 1.

The results are shown in Table 14.

TABLE 14

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 750 | 8 | 8 | 10 | 8 | 10 | 11 |
| Linear speed of recording medium (m/s) | 4.0 | 9 | 8 | 10 | 8 | 10 | 11 |
| Laser spot feed speed (μm/r) | 36 | 10 11 | 8 7 | 9 8 | 8 7 | 10 9 | 11 11 |
| Distribution of reflectance after initialization (±%) | 4.7 | 12 13 | 7 7 | 8 9 | 7 9 | 9 11 | 12 13 |

(*)The number of repeated overwriting times.

It is confirmed that the recording medium No. 6 shows improved overwriting repetition properties similar to the phase-change optical recording medium No. 5 fabricated in Example 5.

EXAMPLE 7

The procedure for fabrication of the phase-change optical recording medium No. 1 in Example 1 was repeated except that the compositions of the lower and upper heat-resistant protective layers were changed as shown in Table 15.

TABLE 15

| Structure of Layers | Film-forming Conditions | | |
|---|---|---|---|
| | Material | Thickness (Å) | Film-forming method |
| Lower heat-resistant protective layer | $(NdF_3)_{55}(ZnS)_{45}$ (mol %) | 1700 | RF Sputtering |
| Recording layer | $Ag_3In_5Sb_{58}Te_{26}N_5Cl_3$ (atom %) | 230 | RF Sputtering |
| Upper heat-resistant protective layer | $(NdF_3)_{55}(ZnS)_{45}$ (mol %) | 350 | RF Sputtering |
| Light reflecting and heat dissipating layer | Al alloy | 900 | DC Sputtering |

Thus, a phase-change optical recording medium No. 7 according to the present invention was fabricated.

The optimal initializing conditions and the distribution of reflectance after initialization are shown in Table 16.

In addition, the overwriting repetition properties of the optical recording medium No. 7 were evaluated in the same as in Example 1.

The results are shown in Table 16.

TABLE 16

| Optimal Initializing Conditions and Distribution of Reflectance after Initialization | | Overwriting Repetition Properties [Jitter value (ns) with respect to 3T signal] | | | | | |
|---|---|---|---|---|---|---|---|
| | Recording power (mW) | No.(*) | | | | | |
| | | 1 | 2 | 100 | 1000 | 5000 | |
| Laser power (mW) | 750 | 8 | 8 | 10 | 8 | 10 | 11 |
| Linear speed of recording medium (m/s) | 4.0 | 9 | 8 | 10 | 8 | 10 | 11 |
| Laser spot feed speed (μm/r) | 36 | 10 11 | 8 8 | 10 9 | 8 7 | 10 9 | 11 11 |
| Distribution of reflectance after initialization (±%) | 4.7 | 12 13 | 7 7 | 8 9 | 7 10 | 9 12 | 12 14 |

(*)The number of repeated overwriting times.

It is confirmed that the recording medium No. 7 shows improved overwriting repetition properties similar to the phase-change optical recording media No. 5 and No. 6 respectively fabricated in Examples 5 and 6.

As previously explained, initial crystallization of the phase-change optical recording medium according to the present invention can be easily carried out. At the same time, the overwriting repetition properties and the recording sensitivity are remarkably improved.

Japanese Patent Application No. 9-344459 filed Nov. 28, 1997 is hereby incorporated by reference.

What is claimed is:
1. A phase-change optical recording medium comprising a substrate, and a lower heat-resistant protective layer, a recording layer capable of recording and erasing information by utilizing changes in the phase of a phase-change recording material in said recording layer, an upper heat-resistant protective layer and a light reflecting and heat dissipating layer, which are successively overlaid on said substrate in this order, said recording material comprising:

Ag, In, Sb and Te as the main elements, at least one additional element selected from the group (1) consisting of B, C, N, Al, Si and P, and at least one additional element selected from the group (2) consisting of halogen atoms and alkali metal elements.

2. The phase-change optical recording medium as claimed in claim 1, wherein said alkali metal elements comprise Na and K.

3. The phase-change optical recording medium as claimed in claim 1, wherein said recording material comprises:

Ag, In, Sb and Te as the main elements, at least one additional element selected from the group (1) consisting of B, C, N, Al, Si and P, and at least one additional element selected from the group (2') consisting of Cl, Br, I, Na and K.

4. The phase-change optical recording medium as claimed in claim 1, wherein said recording material comprises;

Ag, In, Sb and Te as the main elements, at least one additional element selected from the group (1') consisting of B, C, Al, Si and P, and a fluorine (F) atom.

5. The phase-change optical recording medium as claimed in claim 3, wherein the composition of said phase-change recording material in terms of atomic percentage is represented by formula (I):

$$Ag_\alpha In_\beta Sb_\gamma Te_\delta X_\epsilon Y_\kappa \qquad (I)$$

wherein X is at least one additional element selected from the group (1) consisting of B, C, N, Al, Si and P; Y is at least one additional element selected from the group (2') consisting of Cl, Br, I, Na and K; $\alpha+\beta+\gamma+\delta+\epsilon+\kappa=100$; $0.5 \leq \epsilon \leq 5$; and $0.5 \leq \kappa \leq 3$.

6. The phase-change optical recording medium as claimed in claim 4, wherein the composition of said phase-change recording material in terms of atomic percentage is represented by formula (II):

$$Ag_\alpha In_\beta Sb_\gamma Te_\delta X'_\rho Y'_\phi \qquad (II)$$

wherein X' is at least one additional element selected from the group (1') consisting of B, C, Al, Si and P; Y' is a fluorine atom; $\alpha+\beta+\gamma+\delta+\rho+\phi=100$; $0.5 \leq \rho \leq 5$; and $0.5 \leq \phi \leq 3$.

7. The phase-change optical recording medium as claimed in claim 1, wherein said lower heat-resistant protective layer and said upper heat-resistant protective layer exhibit a coefficient of thermal expansion in a range of $10 \times 10^{-6}/°$ C. to $25 \times 10^{-6}/°$ C.

8. The phase-change optical recording medium as claimed in claim 7, wherein said lower heat-resistant protective layer and said upper heat-resistant protective layer comprise at least one compound selected from the group consisting of $NaF$, $BaF_2$, $CoF_2$, $RbF_2$, $SrF_2$, $MgF_2$, $PbF_2$, $KF$, $CeF_3$, $NdF_3$, $ZnS$ and $ZnO$.

* * * * *